(12) United States Patent
Azam et al.

(10) Patent No.: US 12,022,368 B2
(45) Date of Patent: Jun. 25, 2024

(54) BLUETOOTH DEVICE CONNECTION APPROVAL

(71) Applicant: HEWLETT-PACKARD DEVELOPMENT COMPANY, L.P., Houston, TX (US)

(72) Inventors: Syed S. Azam, Houston, TX (US); Alexander W. Clark, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 670 days.

(21) Appl. No.: 16/088,008

(22) PCT Filed: Mar. 30, 2016

(86) PCT No.: PCT/US2016/024894
§ 371 (c)(1),
(2) Date: Sep. 24, 2018

(87) PCT Pub. No.: WO2017/171745
PCT Pub. Date: Oct. 5, 2017

(65) Prior Publication Data
US 2020/0304990 A1    Sep. 24, 2020

(51) Int. Cl.
*G06F 7/04* (2006.01)
*G06F 15/16* (2006.01)
(Continued)

(52) U.S. Cl.
CPC ............. *H04W 4/80* (2018.02); *H04W 12/06* (2013.01); *H04W 12/08* (2013.01); *H04W 12/50* (2021.01); *H04W 12/69* (2021.01); *H04W 12/082* (2021.01)

(58) Field of Classification Search
CPC ..... H04W 4/80; H04W 12/00; H04W 12/003; H04W 12/0051; H04W 12/06
(Continued)

(56) References Cited

U.S. PATENT DOCUMENTS

| 8,594,632 B1 | 11/2013 | Azizi et al. |
| 8,914,024 B2 | 12/2014 | Alharayeri |

(Continued)

FOREIGN PATENT DOCUMENTS

| CN | 104509143 | 4/2015 |
| CN | 105007564 | 10/2015 |
| CN | 105307288 A | 2/2016 |

OTHER PUBLICATIONS

Woolley, Martin, "Bluetooth, Meet the Internet. Internet, say Hello to Bluetooth!", http://blog.bluetooth.com/bluetooth-meet-the-internet-internet-say-hello-to-bluetooth/ , posted Jan. 28, 2015, 5 pages.

*Primary Examiner* — Brandon Hoffman
*Assistant Examiner* — Samuel Ambaye
(74) *Attorney, Agent, or Firm* — Quarles & Brady LLP (57) ABSTRACT

Examples associated with Bluetooth device pairing are described. One example includes storing a set of device pairings. Device pairings may indicate Bluetooth devices that are authorized to connect. An authorization signal is received from a first Bluetooth device. The authorization signal may seek approval to connect with a second Bluetooth device over a Bluetooth connection. A control signal is provided to the first Bluetooth device when a device pairing indicates the first Bluetooth device is authorized to connect to the second Bluetooth device.

18 Claims, 6 Drawing Sheets

(51) Int. Cl.
*H04L 29/06* (2006.01)
*H04W 4/80* (2018.01)
*H04W 12/06* (2021.01)
*H04W 12/08* (2021.01)
*H04W 12/50* (2021.01)
*H04W 12/69* (2021.01)
*H04W 12/082* (2021.01)

(58) Field of Classification Search
USPC .......................................................... 726/4
See application file for complete search history.

(56) References Cited

U.S. PATENT DOCUMENTS

| | | |
|---|---|---|
| 9,148,487 B2 | 9/2015 | Hilburn et al. |
| 2006/0168647 A1 | 7/2006 | Chiloyan |
| 2008/0003997 A1 | 1/2008 | Parkkeinen et al. |
| 2008/0244271 A1 | 10/2008 | Yu |
| 2010/0176919 A1 | 7/2010 | Myers |
| 2010/0278345 A1 | 11/2010 | Alsina et al. |
| 2012/0135683 A1 | 5/2012 | Lee et al. |
| 2012/0238216 A1* | 9/2012 | Hallowell ............. H04W 84/18 455/41.3 |
| 2013/0174252 A1 | 7/2013 | Weber et al. |
| 2013/0288604 A1 | 10/2013 | Chang |
| 2013/0309971 A1* | 11/2013 | Kiukkonen ........... H04W 12/50 455/41.2 |
| 2014/0220894 A1* | 8/2014 | Chen ..................... H04W 12/06 455/41.2 |
| 2014/0273824 A1 | 9/2014 | Fenner et al. |
| 2015/0147970 A1* | 5/2015 | Tan ...................... H04W 12/06 455/41.2 |
| 2015/0189006 A1 | 7/2015 | Smus et al. |
| 2015/0295763 A1 | 10/2015 | Yu et al. |
| 2016/0007144 A1* | 1/2016 | Huang .................. H04W 12/06 455/41.2 |

\* cited by examiner

BLUETOOTH DEVICE CONNECTION APPROVAL

BACKGROUND

Bluetooth is a technology standard for exchanging information between devices wirelessly over short distances. A connection between Bluetooth capable devices is established when a master device seeks to initiate a connection with a slave device. The slave device may then agree to accept the connection. In some case the slave device may wait to accept the connection until, for example, a local user authorizes the pairing of the devices.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with Bluetooth device pairing are described. Bluetooth devices connect via a handshaking process that begins when a master device attempts to begin a pairing process with a slave device. In many cases, a user who has physical access to both the master and slave devices can cause the devices to complete the pairing process. However, it may be insecure to allow Bluetooth devices to be paired arbitrarily.

Instead, for example, when a master device initiates pairing with a slave device, the slave device may query an authorization server for permission to complete the pairing process. The authorization server may store a set of Bluetooth device pairings that indicate Bluetooth devices that are authorized to pair or otherwise provide services and/or communicate with one another. When the authorization server receives the query, the authorization server may check for a Bluetooth device pairing that indicates the master device and the slave device are authorized to connect. If such a pairing exists, the authorization server may transmit a signal back to, the slave device allowing master device and slave device to complete pairing.

Figure 1:
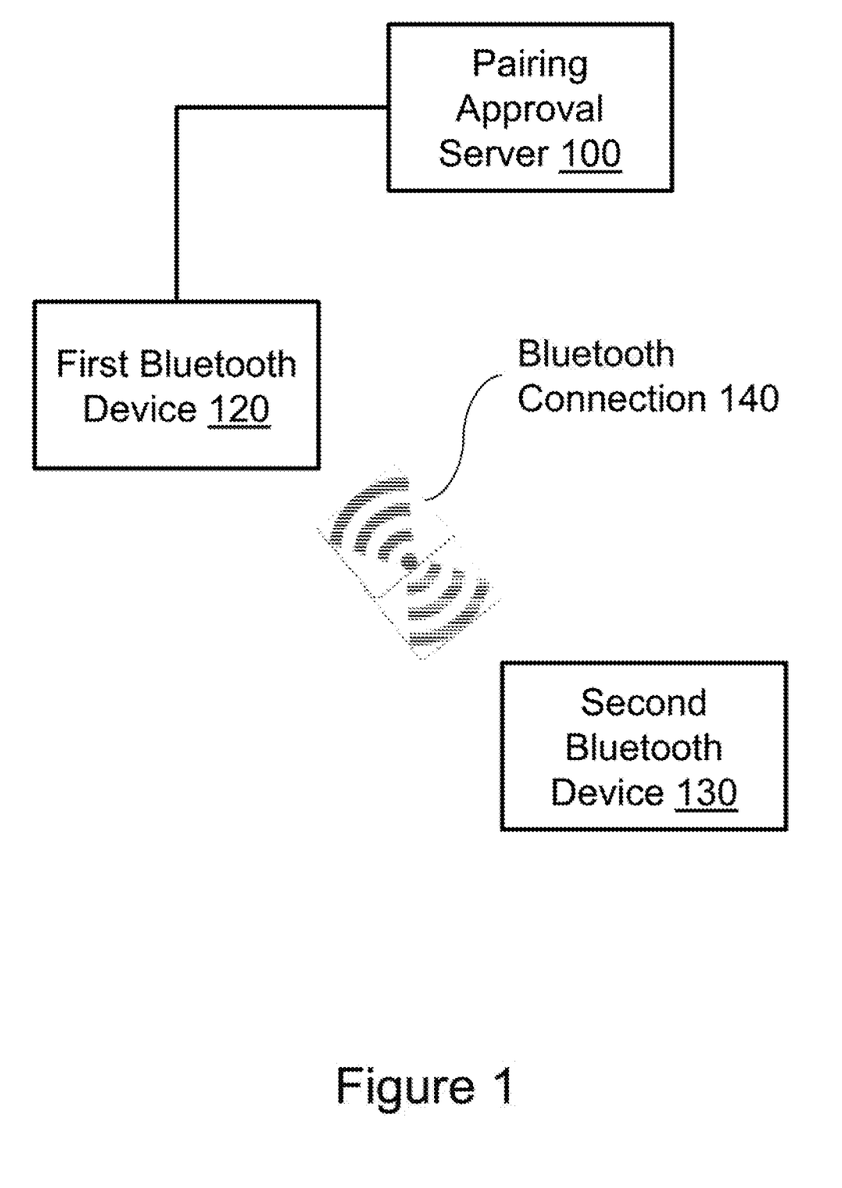
FIG. 1 illustrates an example devices associated with Bluetooth device pairing.

FIG. 1 illustrates example devices associated with Bluetooth device pairing. It should be appreciated that the items depicted in FIG. 1 are illustrative examples, and many different systems, devices, and so forth, may operate in accordance with various examples.

FIG. 1 illustrates several devices associated with Bluetooth device pairing. For example, FIG. 1 illustrates a first Bluetooth device 120 and a second Bluetooth device 130. In this example, second Bluetooth device 130 may be seeking to establish a Bluetooth connection 140 with first Bluetooth device 120. Thus, second Bluetooth device 130 may be at least initially operating as a master device, and first Bluetooth device 120 may be operating as a slave device. However, techniques described herein may operate similarly when first Bluetooth device 120 seeks to establish Bluetooth connection 140 with second Bluetooth device 140.

As used herein, a device referred to as a "Bluetooth device", is intended to convey that the device is capable of connecting with other devices over the Bluetooth standard. Generally, the Bluetooth standard allows devices to communicate wirelessly over short distances. Bluetooth devices may be, for example, fixed devices (e.g., desktop computers, servers, hubs), mobile devices (e.g., cellular phones, tablets), peripherals (e.g., headphones, keyboards), and so forth. In various examples two or more devices may be connected to one another over Bluetooth connections, potentially forming a network of devices. When devices herein are described as performing a pairing or connecting operation, it is intended to convey that the devices are taking actions in accordance with the Bluetooth standard to connect to one another. These actions may include, for example, detection, handshaking, information exchange, and so forth.

As used herein, when a device is referred to as a "master" or "slave", this is intended to convey information regarding control of a Bluetooth connection between two devices. Typically, a master device controls the Bluetooth connection in various aspects including, for example, when there are speaking and listening windows in the connection, and so forth. When two Bluetooth devices are connecting, the connection is initiated by a master device, and the slave device may accept or reject the connection. However, at various points over the life cycle of the Bluetooth connection between these devices, control over the connection may change by agreement of the devices such that the slave devices takes control over the connection and becomes the master device. By way of illustration, a set of headphones may begin as a master device when establishing a connection with a mobile device, but once the connection is established, the mobile device and the headphones may agree that the mobile device should control the connection because most data transmitted over the connection will be audio data transmitted from the mobile device to the headphones. In other examples, which device serves as the master device may change based on, for example, which device is better suited to take on a greater processing burden that sometimes falls on the master device. Consequently, in the example illustrated in FIG. 1, second Bluetooth device 130 is acting as a master device and seeking to establish a connection with first Bluetooth device 120.

After receiving the pairing request from second Bluetooth device 130, first Bluetooth device 120 may transmit a query to pairing approval server 100 requesting permission to accept the pairing request from second Bluetooth device 130 and establish Bluetooth connection 140. The query sent to pairing approval server 100 may be sent, for example, as a part of a pairing process between second Bluetooth device 130 and first Bluetooth device 120. In this example, a response to the query may allow or disallow completion of the pairing process. In other examples, the query may be sent after completing pairing, but prior to enabling some functionality between the devices. In this example, a response to the query may allow or disallow enabling the functionality. In this example, the response to the query may also cause termination of the connection. First Bluetooth device 120 may be connected to pairing approval server 100 directly (e.g., via an Ethernet cable) or over a network (e.g., a wireless network, a cellular network, a wired network, the Internet, a virtual private network, a local area network). In various examples, pairing approval server 100 may perform various security functions for at least one of first Bluetooth device 120, second Bluetooth device 130, a network associated with at least one of pairing approval server 100 and first Bluetooth device 120, and so forth.

To facilitate answering the query from first Bluetooth device 120, pairing approval server 100 may store a set of device pairings that indicate Bluetooth devices that are allowed to connect. This set of device pairings may be managed by an administrator of a network who wants Bluetooth capable devices associated with that network to only connect to certain other devices. Storing the set of device pairings at a server remote from Bluetooth devices (e.g., first Bluetooth device 120) may allow the set of device pairings to be updated without pushing updates to each Bluetooth device affected by an update to the set of device pairings. Various reasons may exist for restricting devices that are allowed to pair. For example, network security may warrant preventing unauthorized devices from pairing with devices on the network. In other examples, certain workstations may be assigned specific peripherals to prevent the peripherals from being used inappropriately and to help manage device assignments, and maintain accurate records of likely locations for various devices owned by an organization.

When pairing approval server 100 receives the signal from first Bluetooth device 120 requesting permission to pair with second Bluetooth device 130, pairing approval server 100 may check the device pairings to see if a Bluetooth connection 140 between the two devices has been authorized. In various examples, the device pairings may identify specific devices that are allowed to pair, classes of devices that are allowed to pair, and so forth. By way of illustration, a classroom computer may be assigned a specific wireless keyboard to deter removal of the keyboard from the classroom. In this example, a device pairing may identify the computer and the keyboard specifically based on unique identifiers for the computer and keyboard. In another example, the classroom computer may be associated with several other peripherals in the same device pairing, indicating a set of peripherals that have been assigned to that classroom computer. A third example device pairing may allow a master device used by an administrator for troubleshooting to connect with any classroom computer in a way that identifies the classroom computers as a category of devices. This category may be determined based on a property of the classroom computers (e.g., a model of the computers, a component of the computers, an application running on the computers, a configuration setting of the computers), based on a list identifying the classroom computers by unique device identifiers, and so forth. Thus, device pairings may describe one-to-one pairings, one-to-many pairings, many-to-one pairings, many-to-many pairings, variable size pairings, and so forth. In some examples, pairings may operate as rules that authorize device pairings under certain conditions. By way of illustration, pairings may be used to allow one user to pair their mobile device with a computer during a first time window (e.g., associated with a room reservation), but terminate the connection at the beginning of a next window to allow a second user to pair their mobile device with the computer, and encourage the first user to honor their time slot.

If a device pairing indicates that first Bluetooth device 120 and second Bluetooth device 130 are authorized to connect, pairing approval server 100 may transmit a signal to first Bluetooth device 120 approving connection of these two devices. In some examples, this may cause first Bluetooth device 120 to complete a pairing process with second Bluetooth device 130 creating Bluetooth connection 140. In other examples, first Bluetooth device 120 may send a signal to pairing approval server 100 requesting connection authorization after a pairing process between first Bluetooth device 120 and second Bluetooth device 130 has been completed. In this example, first Bluetooth device 120 may delay enabling a feature or performing an action until after receiving a signal from pairing approval server 100 approving connection of first Bluetooth device 120 and second Bluetooth device 130. Consequently, in examples where connection permission is requested and/or received after Bluetooth connection 140 is established, receiving the approval from pairing approval server 100 may cause first Bluetooth device 120 to take an action associated with first Bluetooth device 120, second Bluetooth device 130, another device, and so forth. This action may include, for example, transmitting data to second Bluetooth device 130, receiving data from second Bluetooth device 130, enabling a function of one of first Bluetooth device 120 and second Bluetooth device 130, taking control of a connection between first Bluetooth device 120 and second Bluetooth device 130, and so forth.

In cases where no device pairings indicate first Bluetooth device 120 and second Bluetooth device 130 are authorized to connect, pairing approval server 100 may transmit a signal to first Bluetooth device 120 rejecting such a connection. This may cause first Bluetooth device 120 to abort the pairing process, to disconnect Bluetooth connection 140 in cases where permission is sought after creation of Bluetooth connection 140, limit functionality of Bluetooth connection 140, operate with reduced capabilities, and so forth.

Similarly, in some cases, a device pairing for first Bluetooth device 120 and second Bluetooth device 130 may be revoked while Bluetooth connection 140 is already established. This may cause pairing approval server 100 to transmit a signal to first Bluetooth device 120 indicating the revocation of the device pairing. In various examples, the revocation signal may cause first Bluetooth device 120 to terminate Bluetooth connection 140, re-request permission to pair with second Bluetooth device 130 (e.g., in case a different device pairing authorizes Bluetooth connection 140), and so forth.

In an alternative example, second Bluetooth device 130 may be a mobile device or peripheral attempting to initiate a Bluetooth connection with first Bluetooth device 120. In this example, after obtaining information from first Bluetooth device 120 that will facilitate authorizing pairing second Bluetooth device 130 and first Bluetooth device 120, second Bluetooth device 130 may transmit a signal to pairing approval server 100. In this example, if an appropriate device pairing exists, pairing approval server 100 may respond, authorizing Bluetooth connection 140, and thereby causing second Bluetooth device 120 to, for example, complete creation of Bluetooth connection 140, activate a functionality associated with first Bluetooth device 120, second Bluetooth device 130, hand over control of Bluetooth connection 140, and so forth. In this example, second Bluetooth device 130 may not be network enabled itself. Consequently, second Bluetooth device 130 may control first Bluetooth device 120 to transmit and receive communications with pairing approval server 100. If these signals are not transmitted, and/or if approval is not authorized, second Bluetooth device 130 may refuse to perform certain operations, terminate Bluetooth connection 140, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
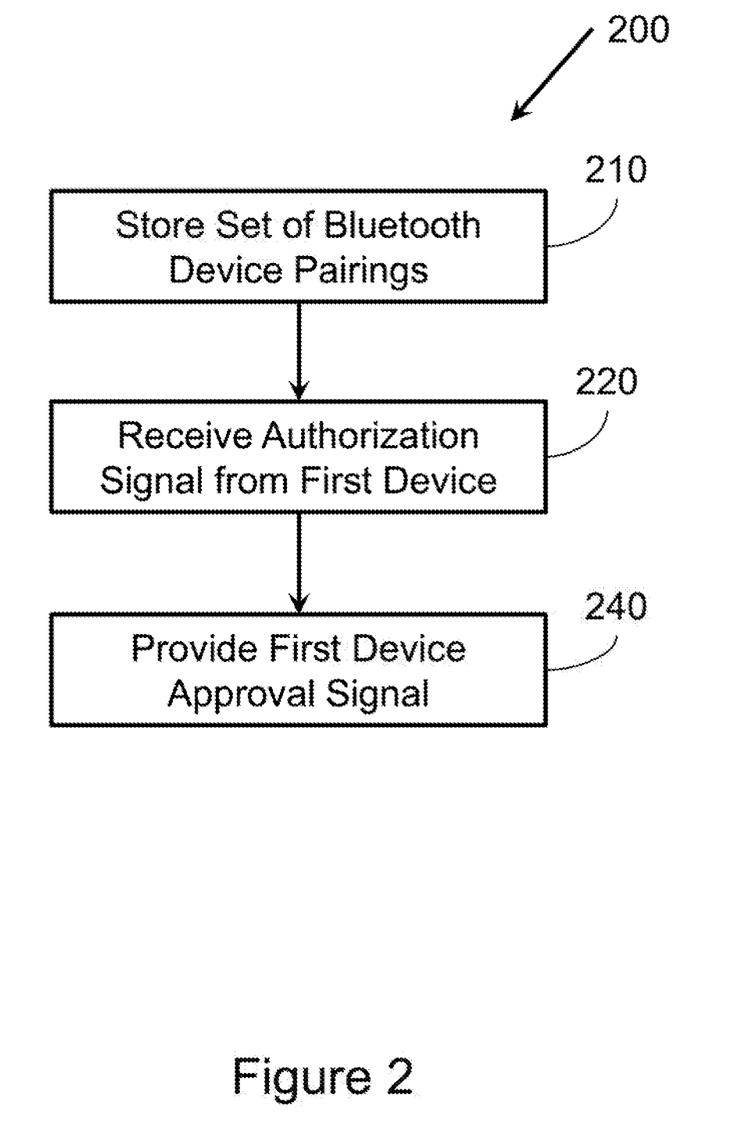
FIG. 2 illustrates a flowchart of example operations associated with Bluetooth device pairing.

FIG. 2 illustrates an example method 200 associated with Bluetooth device pairing. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 includes storing a set of device pairings at 210. The device pairings may indicate Bluetooth devices that are authorized to connect to one another. In some examples, the device pairings may identify Bluetooth devices that are authorized to connect using unique device identifiers associated with specific physical Bluetooth devices. In other examples, device pairings may identify Bluetooth devices that are authorized to connect using device classifications.

Method 200 also includes receiving an authorization signal at 220. The authorization signal may be received from a first Bluetooth device. The authorization signal may seek approval to connect to a second Bluetooth device using a Bluetooth connection. In some examples, the authorization signal may be received from the first Bluetooth device after the first Bluetooth device receives a handshake request from the second Bluetooth device. In various examples, either first Bluetooth device or second Bluetooth device may be acting as the master and/or initiator of the Bluetooth connection. Further, in an example where the first Bluetooth device is not network enabled, the first Bluetooth device may provide the authorization signal via the second Bluetooth device.

Method 200 also includes providing the first Bluetooth device an approval signal at 240. The approval signal may be provided to the first Bluetooth device when a device pairing indicates that the first Bluetooth device is authorized to connect to the second Bluetooth device. The approval signal may control the first Bluetooth device to connect to the second Bluetooth device, enable a functionality, and so forth.

Figure 3:
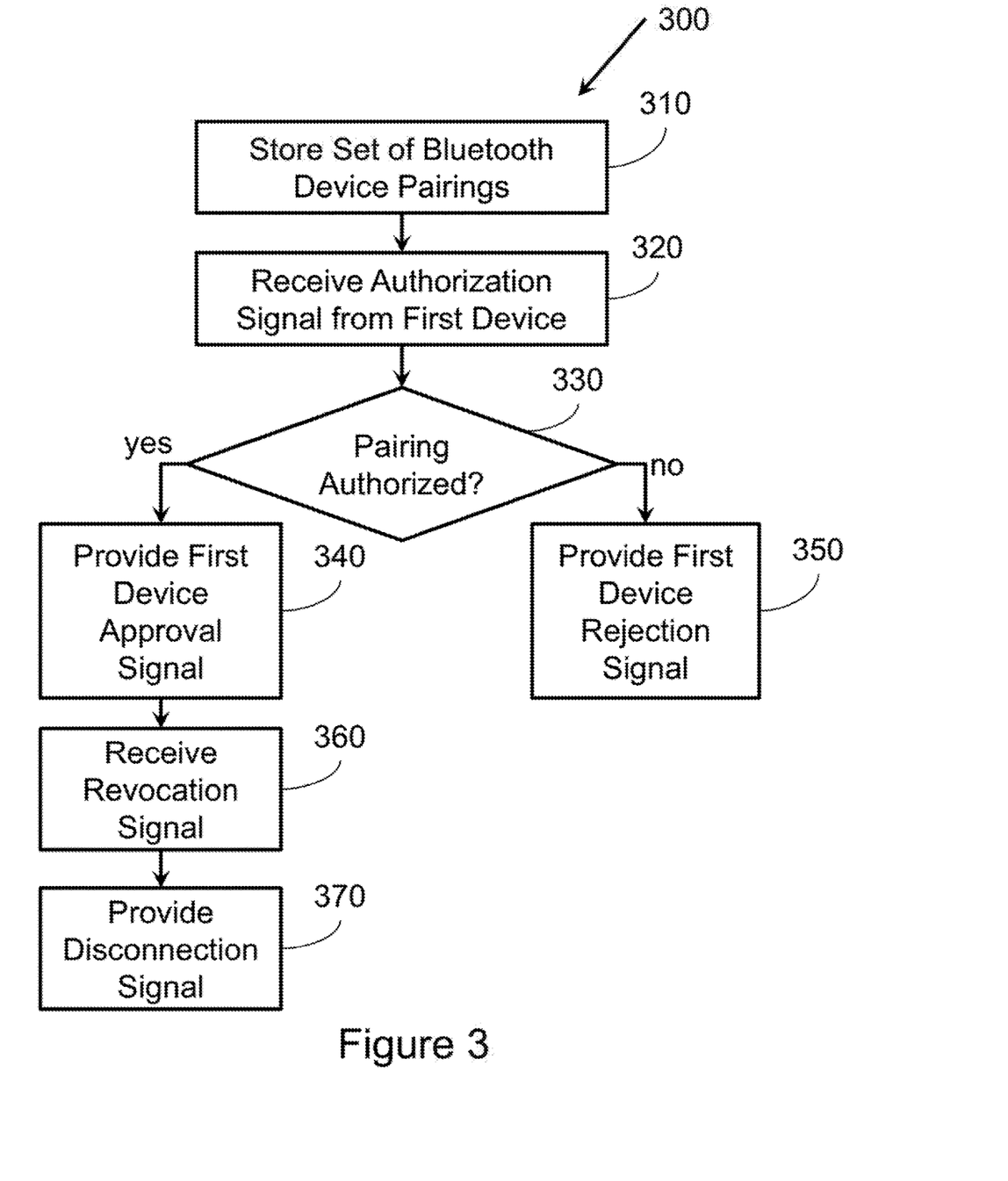
FIG. 3 illustrates another flowchart of example operations associated with Bluetooth device pairing.

FIG. 3 illustrates a method 300 associated with Bluetooth device pairing. Method 300 includes several actions similar to those described above with reference to method 200 (FIG. 2). For example, method 300 includes storing a set of device pairings at 310, receiving an authorization signal from a first device at 320, and providing the first device an approval signal at 340.

Method 300 also includes, after receiving the authorization signal from the first device at action 320, determining, at 330, whether the first device is authorized to connect to a second Bluetooth device by a device pairing stored at action 310. If a device pairing indicates that the first Bluetooth device is authorized to connect to the second Bluetooth device, method 300 may proceed to action 340 and provide the first device an approval signal. In an example where no device pairing indicates that the first Bluetooth device is authorized to connect to the second Bluetooth device, method 300 may proceed to action 350, and provide the first device a rejection signal. The rejection signal may control the first Bluetooth device to not establish a connection to the second Bluetooth device. In other examples, the rejection signal may control the first Bluetooth device to disconnect a connection to the second Bluetooth device, and so forth.

Method 300 also includes receiving a revocation signal at 360. The revocation signal may be associated with a revoked device pairing. This situation may occur when, for example, an administrator determines that it is no longer desirable for two devices to be authorized to connect with one another. Accordingly, the administrator may revoke a device pairing from the set of Bluetooth device pairings so that these two devices are no longer authorized to connect. In another example, the revocation signal may occur as a result of an expiration of a time period during which pairing is approved. In these examples, assuming these two devices are already connected, method 300 may provide the first Bluetooth device a disconnection signal at 370. The disconnection signal may cause the first Bluetooth device to terminate a connection with the second Bluetooth device. In other examples, it may not be known whether the first Bluetooth device is still connected to the second Bluetooth device. In these scenarios, for example, a disconnection signal may be sent to the first Bluetooth device whenever detecting a revocation of a member of the set of Bluetooth device pairings associated with the first Bluetooth device. In these examples, the disconnection signal may cause the first Bluetooth device to terminate the connection to the second Bluetooth device, to re-transmit an authorization signal in case another device pairing authorizes a connection between the first Bluetooth device and the second Bluetooth device, and so forth.

Figure 4:
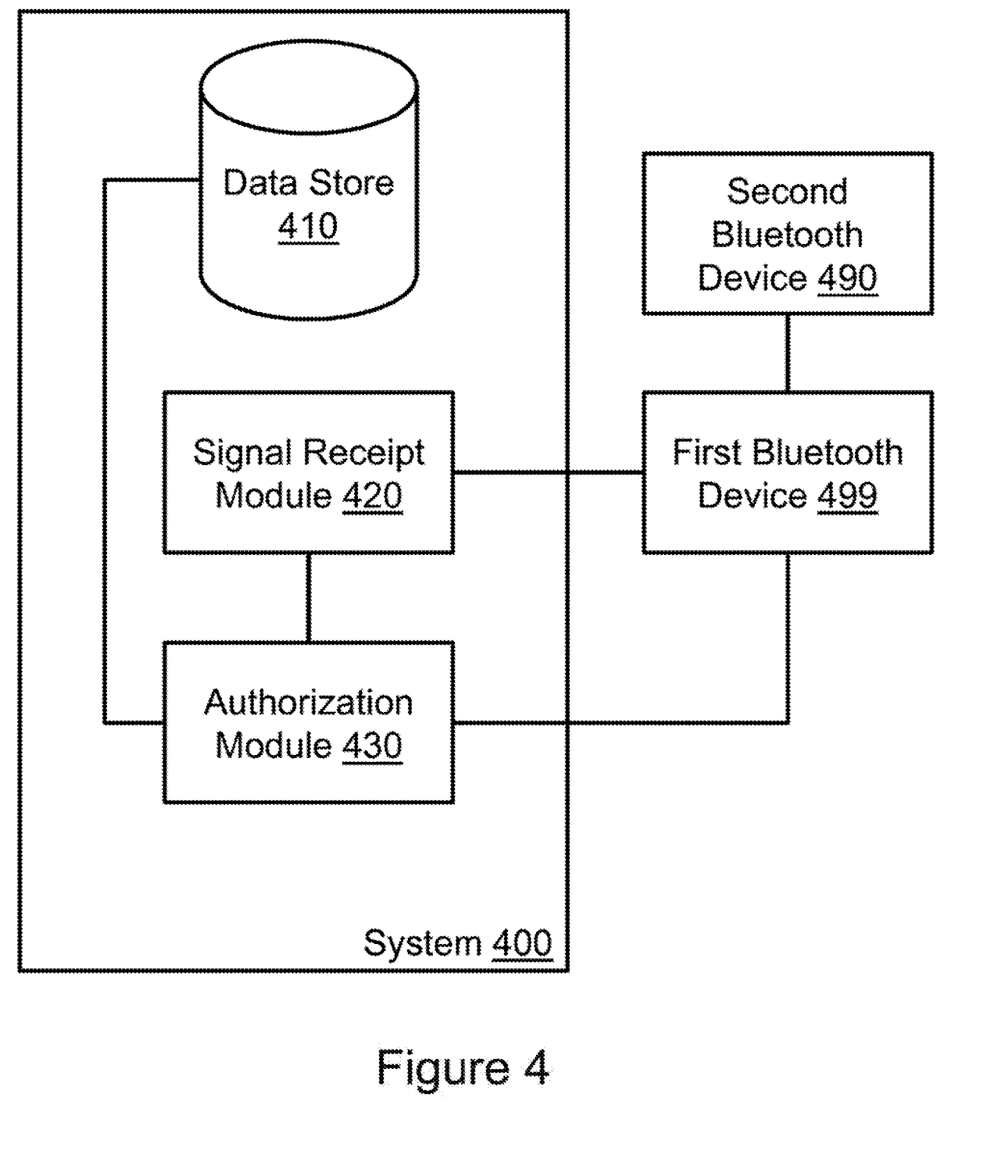
FIG. 4 illustrates an example system associated with Bluetooth device pairing.

FIG. 4 illustrates a system 400 associated with Bluetooth device pairing. System 400 includes a data store 410. Data store 410 may store a set of Bluetooth device pairings that indicate when Bluetooth devices are authorized to connect. In various examples, Bluetooth devices may be identified in data store 510 based on unique device identifiers. In other examples, Bluetooth devices may be identified by classes of devices, and so forth. Device pairings may identify devices on a one-to-one basis, a one-to-many basis, a many-to-one basis, a many-to-many basis, variable size bases, a conditional basis, and so forth.

System 400 also includes a signal receipt module 420. Signal receipt module 420 may receive an authorization request signal from a first Bluetooth device 499. The authorization request signal may be a request from first Bluetooth device 499 to communicate to a second Bluetooth device 490. In various examples, the authorization request signal may be transmitted by first Bluetooth device 499 prior to completing a handshaking operation with second Bluetooth device 490 that establishes a communicable connection between first Bluetooth device 499 and second Bluetooth device 490. In other examples, first Bluetooth device 499 may transmit the authorization request signal after completing handshaking with second Bluetooth device 490. However, in this example, the authorization request signal may occur prior to taking an action associated with device functionality of at least one of first Bluetooth device 499, second Bluetooth device 599, another device, and so forth.

Depending on how devices are identified in device pairings in data store 410, devices may be identified in the authorization request signal using a variety of identifiers. For example, when data store 510 stores device pairings that identify devices using unique device identifiers, the authorization request signal may include a unique device identifier associated with first Bluetooth device 499 and a unique device identifier associated with second Bluetooth device 490. In another example, the authorization request signal may contain device classifications for first Bluetooth device 499 and second Bluetooth device 490, and/or other information that may be useful for determining whether first Bluetooth device 499 and second Bluetooth device 490 are authorized to connect to one another.

System 400 also includes an authorization module 430. Authorization module 430 may provide a permission signal to first Bluetooth device 499. The permission signal may be provided when first Bluetooth device 499 and second Bluetooth device 490 are authorized to connect by a device pairing in data store 410. The permission signal may permit first Bluetooth device 499 to communicate with second Bluetooth device 490.

By way of illustration, in the example where first Bluetooth device 499 transmits the authorization request signal prior to completing handshaking with second Bluetooth device 490, the permission signal may allow first Bluetooth device 499 to complete handshaking with second Bluetooth device 490. In an example where the authorization request signal and the permission signal are exchanged after handshaking, the permission signal may cause first Bluetooth device 499 to take an action associated with first Bluetooth device 499, second Bluetooth device 490, another device, and so forth. This action may include, for example, transmitting data to second Bluetooth device 490, receiving data from second Bluetooth device 490, enabling a function of one of first Bluetooth device 499 and second Bluetooth device 490, taking control of a connection between first Bluetooth device 499 and second Bluetooth device 490, and so forth.

In some examples authorization module 430 may provide a rejection signal to first Bluetooth device 499. The rejection signal may be provided to first Bluetooth device 499 when first Bluetooth device 499 and second Bluetooth device 490 are not authorized to connect based on device pairings in data store 410. The rejection signal may prevent first Bluetooth device 499 from completing handshaking with second Bluetooth device 490, may cause first Bluetooth device 499 to terminate a connection with second Bluetooth device 490, and so forth.

Figure 5:
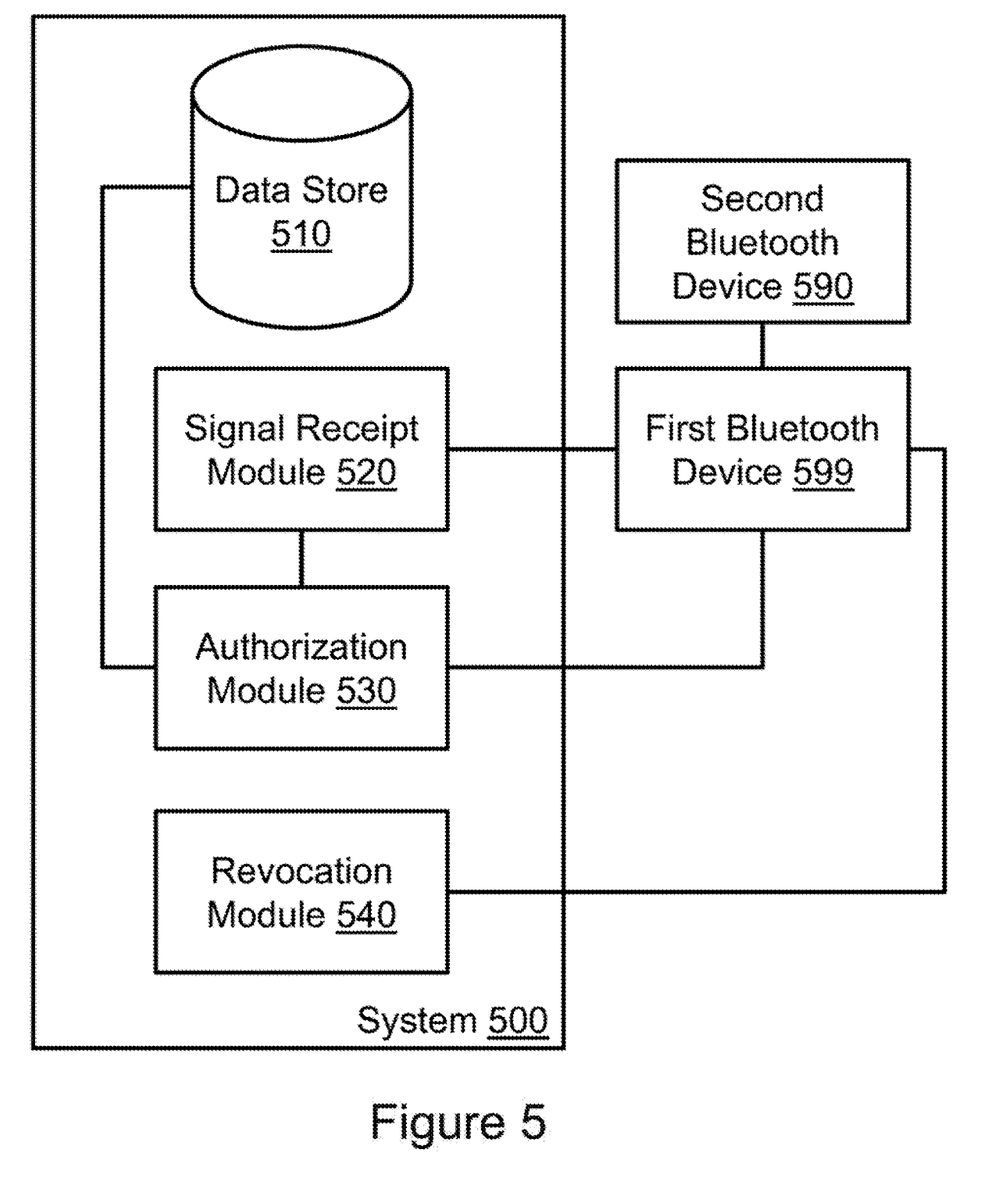
FIG. 5 illustrates another example system associated with Bluetooth device pairing.

FIG. 5 illustrates a system 500 associated with Bluetooth device pairing. System 500 includes several items similar to those described above with reference to system 400 (FIG. 4). For example, system 500 includes a data store, a signal receipt module 520, and an authorization module. Various components of system 500 are in communication with a first Bluetooth device 599 over the life cycle of a communicative connection between first Bluetooth device 599 and a second Bluetooth device 590.

System 500 also includes a revocation module 540. Revocation module 540 may detect a revocation of a member of the set of Bluetooth device pairings in data store 510. When such a revocation is detected, revocation module 540 may transmit a disconnection signal to first Bluetooth device 599. The disconnection signal may cause first Bluetooth device 599 to terminate a connection with second Bluetooth device 590, or take another appropriate action.

Figure 6:
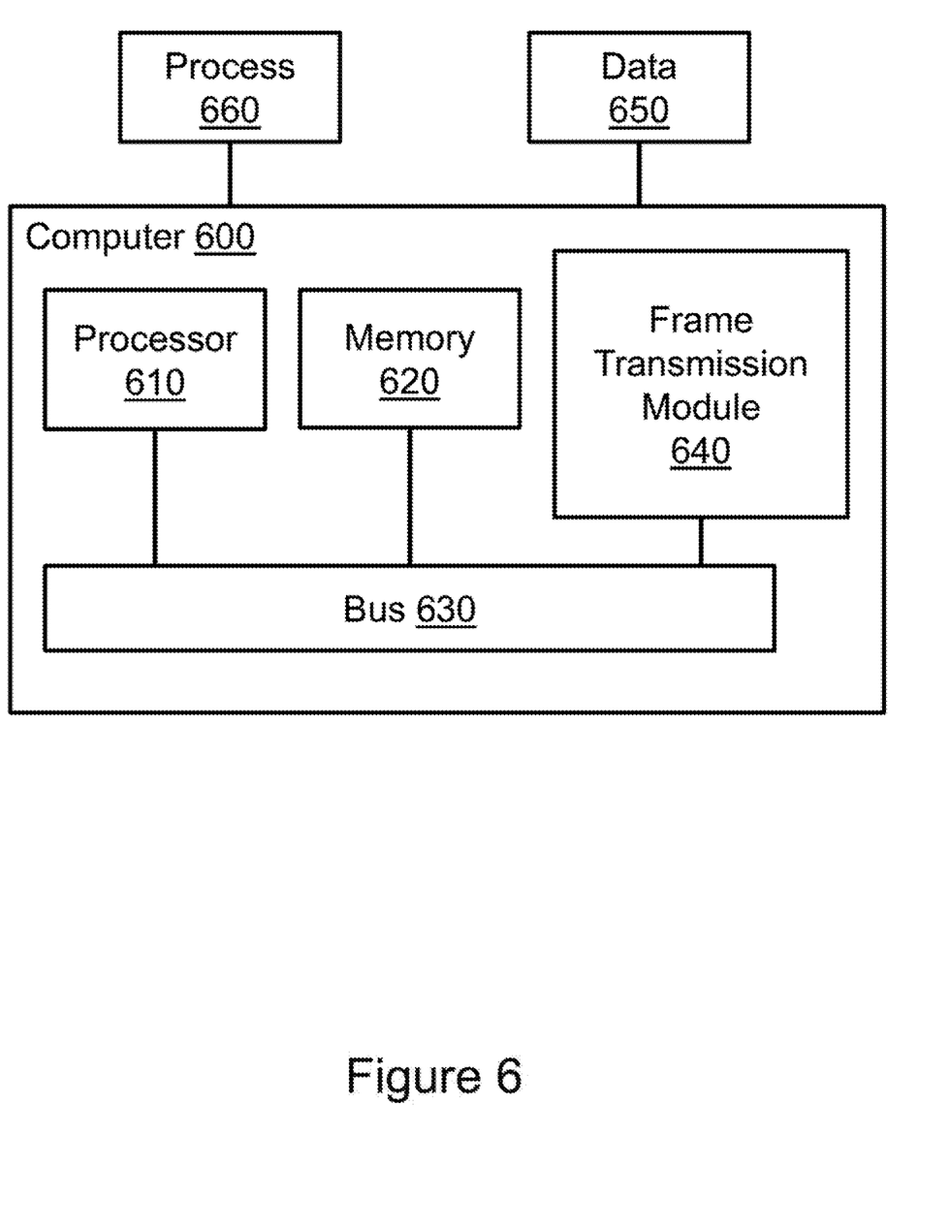
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a Bluetooth device pairing module 640. Bluetooth device pairing module 640 may perform, alone or in combination, various functions described above with reference to the example systems, methods, and so forth. In different examples, Bluetooth device pairing module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   storing, by a pairing approval server, a set of device pairings, where each device pairing indicates a pair of Bluetooth devices that are authorized to connect with one another via Bluetooth;
   receiving, by the pairing approval server, an authorization signal from a first Bluetooth device, where the authorization signal seeks approval to connect to a second Bluetooth device over a Bluetooth connection, wherein the authorization signal is received from the first Bluetooth device after the first Bluetooth device receives a handshake request from the second Bluetooth device, and wherein the pairing approval server, the first Bluetooth device, and the second Bluetooth device are different devices;
   responsively determining, by the pairing approval server, whether the pair of Bluetooth devices of any device pairing includes the first Bluetooth device and the second Bluetooth device;
   responsive to determining that the pair of Bluetooth devices of any device pairing includes the first Bluetooth device and the second Bluetooth device, providing, by the pairing approval server to the first Bluetooth device, an approval signal indicating that the first Bluetooth device is authorized to connect to the second Bluetooth device;

receiving, by the pairing approval server, a revocation signal associated with a revoked device pairing; and when the first Bluetooth device was authorized to connect to the second Bluetooth device based on the authorized the device signal, providing, by the pairing approval server, a disconnection signal to the first Bluetooth device that causes the first Bluetooth device to terminate a connection to second Bluetooth device.

2. The method of claim 1, further comprising:

responsive to determining that the pair of Bluetooth devices of no device pairing includes the first Bluetooth device and the second Bluetooth device, providing, by the pairing approval server to the first Bluetooth device, a rejection signal indicating that the first Bluetooth device is not authorized to connect with the second Bluetooth device.

3. The method of claim 1, wherein the device pairings identify Bluetooth devices that are authorized to connect using unique device identifiers associated with specific physical Bluetooth devices.

4. The method of claim 1, wherein the device pairings identify Bluetooth devices that are authorized to connect using authorized categories of Bluetooth devices.

5. A pairing approval server comprising:

a data store to store a set of Bluetooth device pairings that each indicate a pair of Bluetooth devices that are authorized to connect;

a processor; and a memory storing instructions executable by the processor to:

receive an authorization request signal from a first Bluetooth device requesting permission to communicate with a second Bluetooth device over Bluetooth, wherein the authorization signal is received from the first Bluetooth device after the first Bluetooth device receives a handshake request from the second Bluetooth device, wherein the pairing approval server, the first Bluetooth device, and the second Bluetooth device are different devices;

responsively determine whether the pair of Bluetooth devices of any device pairing includes the first Bluetooth device and the second Bluetooth device;

responsive to determining that the pair of Bluetooth devices of any device pairing includes the first Bluetooth device and the second Bluetooth device, provide a permission signal to the first Bluetooth device indicating that the first Bluetooth device is permitted to communicate with the second Bluetooth device;

detect a revocation of a member of the set of Bluetooth device pairings; and transmit a disconnection signal to the first Bluetooth device in response to the revocation of the member of the set of Bluetooth device pairings, where the disconnection signal causes the first Bluetooth device to terminate a connection with the second Bluetooth device.

6. The pairing approval server of claim 5, wherein the first Bluetooth device transmits the authorization request signal prior to completing handshaking with the second Bluetooth device.

7. The pairing approval server of claim 6, wherein the permission signal causes the first Bluetooth device to complete handshaking with the second Bluetooth device.

8. The pairing approval server of claim 5, wherein the first Bluetooth device transmits the authorization request signal after completing handshaking with the second Bluetooth device and prior to taking an action associated with device functionality of at least one of the first Bluetooth device and the second Bluetooth device.

9. The pairing approval server of claim 8, wherein the permission signal causes the first Bluetooth device to take an action associated with at least one of the first Bluetooth device and the second Bluetooth device.

10. The pairing approval server of claim 9, wherein the action includes transmitting data to the second Bluetooth device, receiving data from the second Bluetooth device, enabling a function of one of the first Bluetooth device and the second Bluetooth device, and/or taking control of a connection between the first Bluetooth device and the second Bluetooth device.

11. The pairing approval server of claim 5, wherein the instructions are executable by the processor to further:

responsive to determining that the pair of Bluetooth devices of no device pairing includes the first Bluetooth device and the second Bluetooth device, provide a rejection signal to the first Bluetooth device indicating that the first Bluetooth device and the second Bluetooth device are not authorized to connect.

12. The pairing approval server of claim 5, wherein Bluetooth devices are identified in the data store based on unique device identifiers and where the authorization request signal includes a unique device identifier associated with the first Bluetooth device and a unique device identifier associated with the second Bluetooth device.

13. The pairing approval server of claim 5, wherein Bluetooth devices are identified in the data store based on classifications that categorize the Bluetooth devices based on a parameter of the Bluetooth devices.

14. The pairing approval server of claim 13, wherein the parameter includes one of a model of the Bluetooth devices, a component of the Bluetooth devices, an application running on the Bluetooth devices, and a configuration setting of the Bluetooth devices.

15. The method of claim 4, wherein the Bluetooth devices are categorized into the authorized categories based on a property of the Bluetooth devices.

16. The method of claim 1, where the first Bluetooth device transmits the authorization signal prior to completing handshaking with the second Bluetooth device.

17. The method of claim 1, where the approval signal causes the first Bluetooth device to complete handshaking with the second Bluetooth device.

18. The method of claim 1, where the first Bluetooth device transmits the authorization signal after completing handshaking with the second Bluetooth device and prior to taking an action associated with device functionality of at least one of the first Bluetooth device and the second Bluetooth device.

* * * * *